(No Model.)

E. N. BOWEN.
BICYCLE WHEEL.

No. 328,280. Patented Oct. 13, 1885.

Witnesses:
Chas. J. Buchheit
Theodore L. Popp

Ephraim N. Bowen — Inventor.
By Wilhelm Bonner
Attorneys.

UNITED STATES PATENT OFFICE.

EPHRAIM N. BOWEN, OF BUFFALO, NEW YORK, ASSIGNOR OF ONE-HALF TO WILLIAM S. BULL, OF SAME PLACE.

BICYCLE-WHEEL.

SPECIFICATION forming part of Letters Patent No. 328,280, dated October 13, 1885.

Application filed August 13, 1885. Serial No. 174,325. (No model.)

*To all whom it may concern:*

Be it known that I, EPHRAIM B. BOWEN, of the city of Buffalo, in the county of Erie and State of New York, have invented new and useful Improvements in Bicycle-Wheels, of which the following is a specification.

This invention relates to an improvement in that class of wheels for bicycles, tricycles, and similar vehicles in which the spokes are arranged in lines tangential to a circle drawn concentric with the axle of the wheel through the points at which the spokes bear upon the hub.

The object of my invention is to increase the strength and durability of the wheel and to render the spokes capable of being easily tightened or replaced if required.

My invention consists to that end of the improvements which will be hereinafter fully set forth, and pointed out in the claims.

Figure 1:
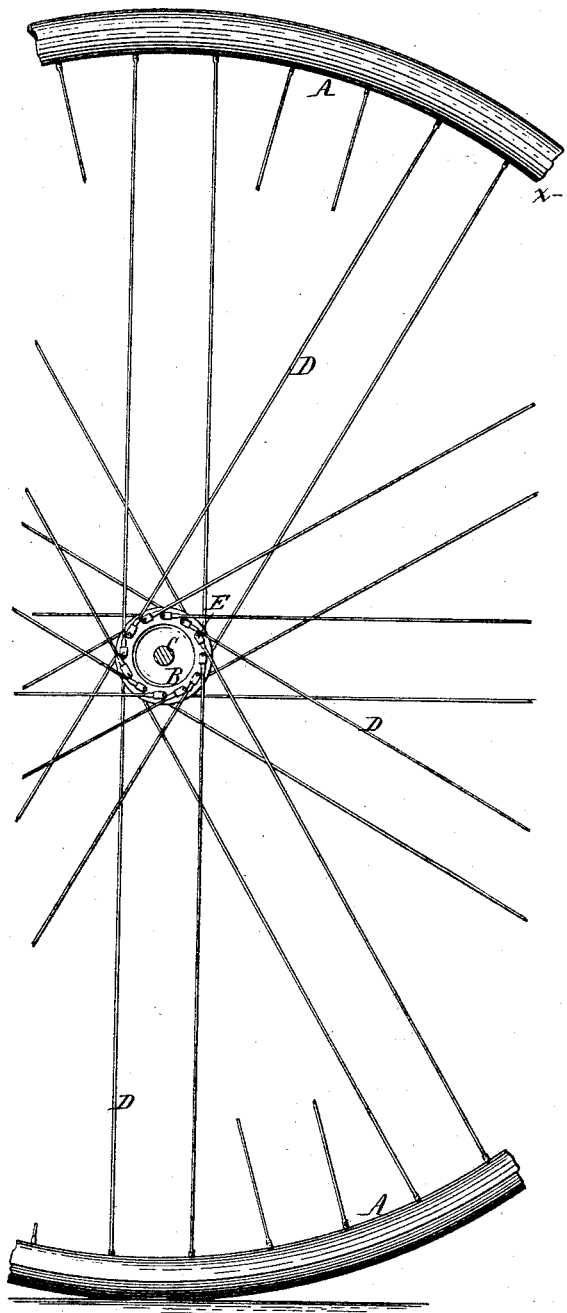
Figure 2:
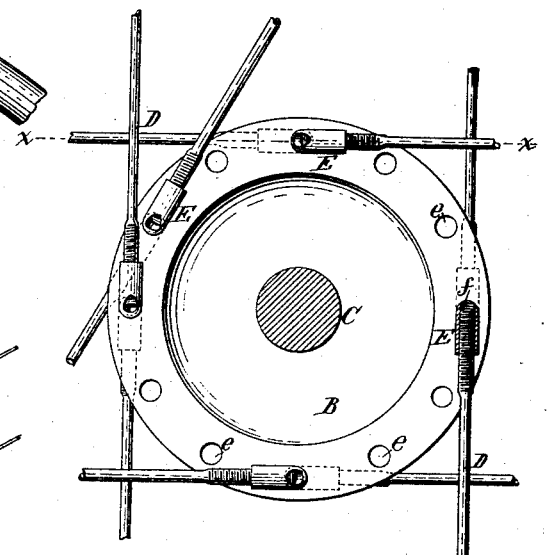
Figure 3:
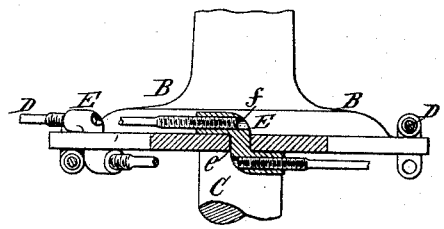
Figure 4:
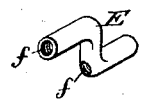

In the accompanying drawings, Figure 1 is a fragmentary side elevation of a wheel provided with my improvement. Fig. 2 is a side elevation of the hub on an enlarged scale. Fig. 3 is a horizontal section in line $x\,x$, Fig. 2. Fig. 4 is a perspective view of one of the nipples which connects the inner ends of two spokes.

Like letters of reference refer to like parts in the several figures.

A represents the rim of the wheel; B, the hub; C, the axle, and D the spokes. The latter are arranged tangential to a circle drawn to the points at which the inner ends of the spokes are attached to the hub concentric with the axle of the wheel. The outer ends of the spokes are attached to the rim in any suitable manner—for instance, by heads or by screw-threads. The inner ends of every two spokes lying in the same straight or tangential line are connected by a nipple, E, which is bent through an opening, $e$, in the hub, and provided on opposite sides of the hub-flange with screw-threaded sockets $f$, in which the screw-threaded inner ends of the spokes are adjustably secured, as clearly represented in Figs. 2 and 3. The bent form of the nipple securely attaches the same to the hub-flange without any other fastening. Upon turning a spoke in one or the other direction it is tightened or loosened by its threaded end working in the threaded socket of the nipple, thereby affording means for tightening or adjusting each spoke separately. Each spoke can also be readily secured in case of breakage by disconnecting it from the rim and the nipple.

I claim as my invention—

1. In a wheel, the combination, with the rim and hub, of two tangential spokes attached with their outer ends to the rim and having their inner ends connected by a nipple, which is attached to the hub, substantially as set forth.

2. In a wheel, the combination, with the rim and hub provided with an opening, of two tangential spokes attached with their outer ends to the rim and having their inner ends screw-threaded, and a bent nipple seated in the opening of the hub, and provided on opposite sides of the hub with screw-threaded sockets which receive the inner screw-threaded ends of the spokes, substantially as set forth.

Witness my hand this 5th day of August, 1885.

E. N. BOWEN.

Witnesses:
JNO. J. BONNER,
CARL F. GEYER.